United States Patent
Newton et al.

(10) Patent No.: US 11,808,379 B2
(45) Date of Patent: Nov. 7, 2023

(54) ANGLE COCK REPAIR CARTRIDGE

(71) Applicant: NEW YORK AIR BRAKE, LLC, Watertown, NY (US)

(72) Inventors: Steven Newton, Adams, NY (US); Jerome O'Rourke, Henderson, NY (US); Danial Rowland, Adams Center, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 75 days.

(21) Appl. No.: 16/774,053

(22) Filed: Jan. 28, 2020

(65) Prior Publication Data
US 2020/0240529 A1 Jul. 30, 2020

Related U.S. Application Data

(60) Provisional application No. 62/797,656, filed on Jan. 28, 2019.

(51) Int. Cl.
*F16K 5/06* (2006.01)
*F16K 31/60* (2006.01)

(52) U.S. Cl.
CPC ............ *F16K 5/0636* (2013.01); *F16K 31/60* (2013.01)

(58) Field of Classification Search
CPC ...... F16K 5/0636; F16K 31/60; F16K 27/067; F16K 5/0631; Y10T 137/0508; Y10T 137/0519; Y10T 137/6017; Y10T 137/6038; Y10T 137/6041; Y10T 137/6045
See application file for complete search history.

(56) References Cited

U.S. PATENT DOCUMENTS

| | | | | |
|---|---|---|---|---|
| 3,168,900 A | * | 2/1965 | Hansen | F16K 5/0689 137/454.6 |
| 3,171,431 A | * | 3/1965 | Hansen | F16K 5/0689 137/454.6 |
| 3,192,948 A | * | 7/1965 | Anderson | F16K 5/0689 251/315.08 |
| 3,223,111 A | * | 12/1965 | Anderson | F16K 5/0689 137/454.6 |
| 3,648,723 A | * | 3/1972 | Nelson | F16K 27/067 137/454.6 |
| 4,423,749 A | * | 1/1984 | Schmitt | F16K 5/0689 251/315.11 |
| 5,246,203 A | * | 9/1993 | McKnight | F16K 5/0642 137/454.2 |
| 6,672,563 B2 | * | 1/2004 | Chang | F16K 5/0689 251/170 |
| 9,551,425 B2 | * | 1/2017 | Buck | F16K 5/0689 |
| 2015/0233478 A1 | * | 8/2015 | Buck | F16K 5/201 251/315.1 |

* cited by examiner

*Primary Examiner* — Michael R Reid
(74) *Attorney, Agent, or Firm* — David L. Nocilly; Bond, Schoeneck & King, PLLC (57) ABSTRACT

A replacement cartridge for repairing rather than replacing an angle cock. The cartridge has a ball key with a ball and a shaft. A unitary ball seat that has first and second internal bearing surfaces for engaging the ball is used to support the ball key when installed in the angle cock body that is being repaired. A cover is positioned over the ball seat and defines a bore through which the shaft of the ball key extends. A handle is coupled to the shaft of the ball key so that a user may rotate the ball between the internal bearing surfaces between an open position and a closed position.

8 Claims, 12 Drawing Sheets

FIG. 1

PRIOR ART

ANGLE COCK REPAIR CARTRIDGE

CROSS-REFERENCE TO RELATED APPLICATIONS

The present application claims priority to U.S. Provisional Application No. 62/797,656 filed on Jan. 28, 2019.

BACKGROUND OF THE INVENTION

1. Field of the Invention

The present invention to rail car angle cocks and, more specifically, to an angle cock design that facilitates repairs in the field.

2. Description of the Related Art

Angle cocks are used on all types of conventional freight and intermodal rails, as well as locomotives, for attachment to the brake pipe so that the brake pipe may be selectively opened or closed. When an angle cock fails in the field, however, the entire device must be removed by the appropriate individuals. Accordingly, there is a need in the art for an angle cock design that can be easily repaired rather than needing to be replaced in its entirety.

BRIEF SUMMARY OF THE INVENTION

The present invention comprises a replacement cartridge for an angle cock. The cartridge has a ball key with a ball and a shaft. A unitary ball seat having first and second internal bearing surfaces for engaging opposing sides of the ball supports the ball key when installed in an angle cock body. A cover is positioned over the ball seat and has a bore formed therethrough through which the shaft of the ball key may extend. A handle is coupled to the shaft of the ball key so that a user may rotate the ball between the internal bearing surfaces between an open position and a closed position. The ball and the shaft of the ball key may be integrally formed together. The ball and the shaft of the ball key may instead be distinct parts that are secured together.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
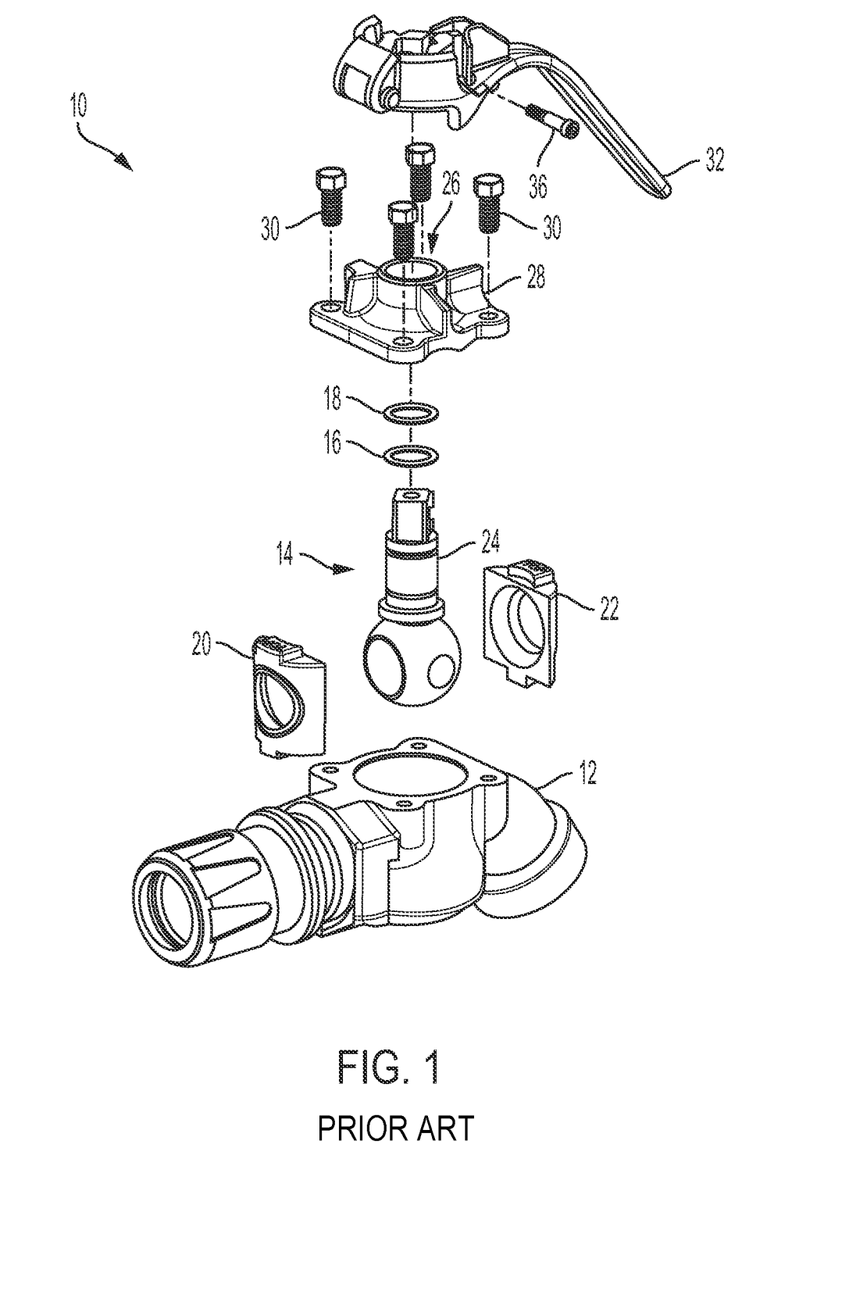
FIG. 1 is an exploded view of an angle cock that may be repaired by an angle cock cartridge according to the present invention.

Referring to the figures, wherein like numeral refer to like parts throughout, there is seen in FIG. 1 an angle cock 10 having a design that is difficult to repair in the field. Angle cock 10 comprises a main body 12 housing a ball key 14 that is sealed with two O-rings 16 and 18. Ball key 14 is positioned within body 12 between two ball seats 20 and 22. The ball key shaft 24 of ball key 14 extends through a bore 26 in a cover 28 that is secured to body 12 via bolts 30 to enclose ball key 14 and ball seats 20 and 22, with O-rings 16 and 18 providing a seal against bore 26 of cover 28. Ball key shaft 24 is secured to a locking handle 32 with a self-tapping screw 36 that may be torqued to between 8.2 and 10 ft-lbs in normal practice. A repair in the field requires the user to manually position two ball seats 20 and 22 against ball key 14, hold the three pieces together, and then insert them into body 12 of an angle cock 10 to be repaired.

Figure 2:
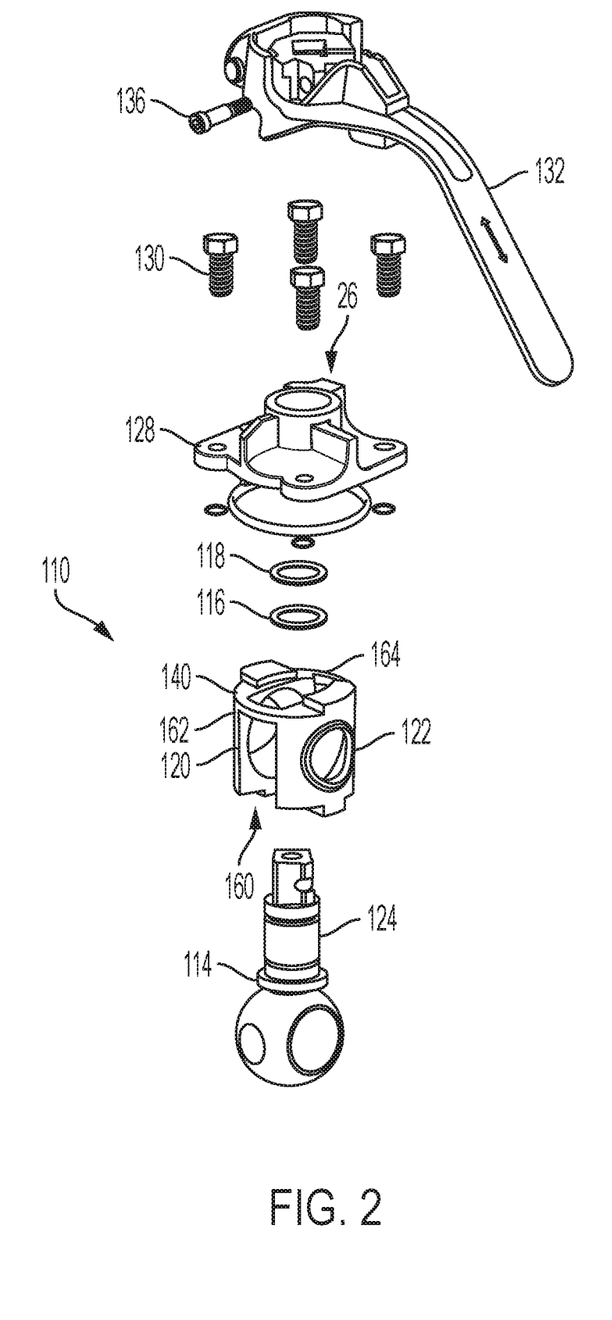
FIG. 2 is an exploded view of an angle cock cartridge according to the present invention.
Figure 3:
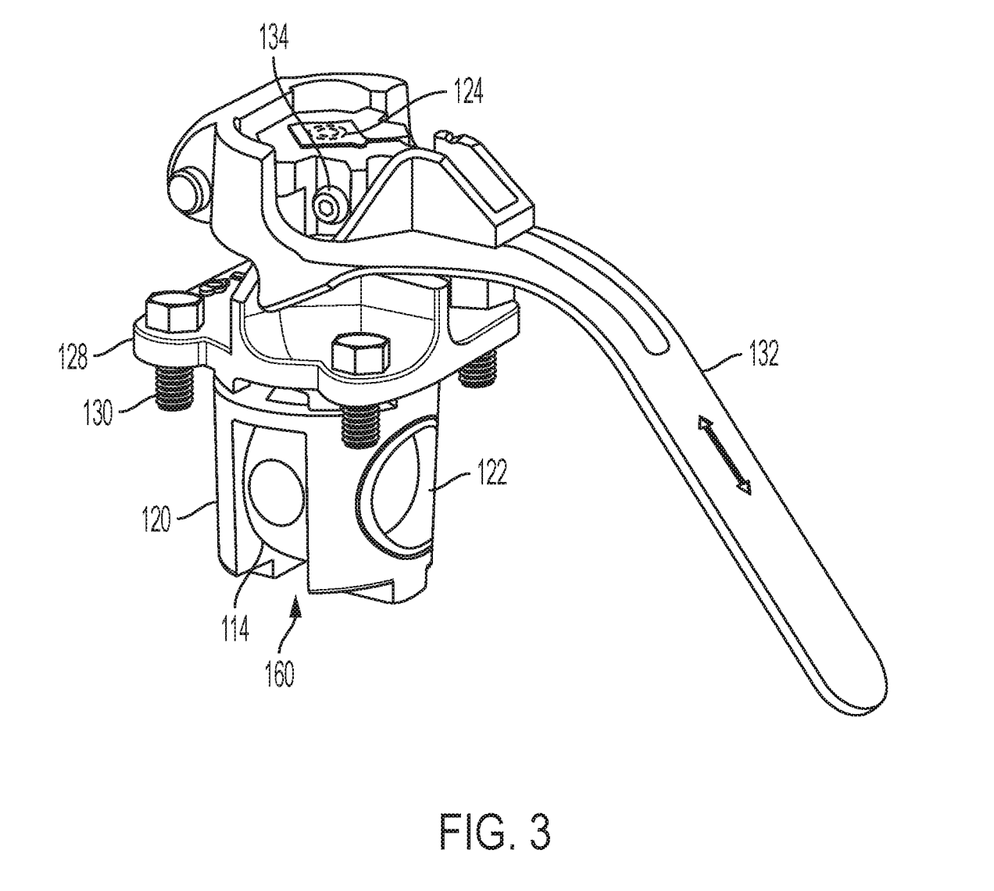
FIG. 3 is a perspective view of an angle cock cartridge according to the present invention.

Referring to FIGS. 2 and 3, a first embodiment of the present invention comprises a repair cartridge 100 for angle cock 10. Repair cartridge 100 includes a ball key 114 having O-rings 116 and 118 positioned about ball key shaft 124 that extends upwardly through a cover 128 to engage a handle 132. Repair cartridge 100 further includes a unitary ball seat 140 that includes internal surfaces 120 and 122 that act as ball seats, i.e., ball seat 140 is integrally formed with internal surfaces 120 and 122 so that all three functional elements are part of a discrete physical structure. Ball seat 140 includes a lower opening 160 for accepting shaft 124 and allowing ball key 114 to be positioned between internal surfaces 120 and 122 prior to or during a replacement into a legacy angle cock 10. The opposing end of ball seat 140 includes a pair of spacers 162 and 164 that are integrally formed with surfaces 120 and 122 that act as ball seats, and maintain surfaces 120 and 122 in spaced relation to each other and in secured relation to ball key 114 when positioned therein. Repair cartridge 100 may be inserted into legacy angle cock 10 to replace one or more worn out components, such as ball key 14, ball seat 20 or 22, cover 28, or O-ring 16 or 18. Worn out components are removed by unbolting cover 28 and removing all of the parts, the inserting repair cartridge 100, and then bolting cover 128 to body 12. As before, handle 132 may be secured to ball key shaft 124 with a self-tapping screw 136 torqued to between 8.2 and 10 ft-lbs in normal practice.

Figure 4:
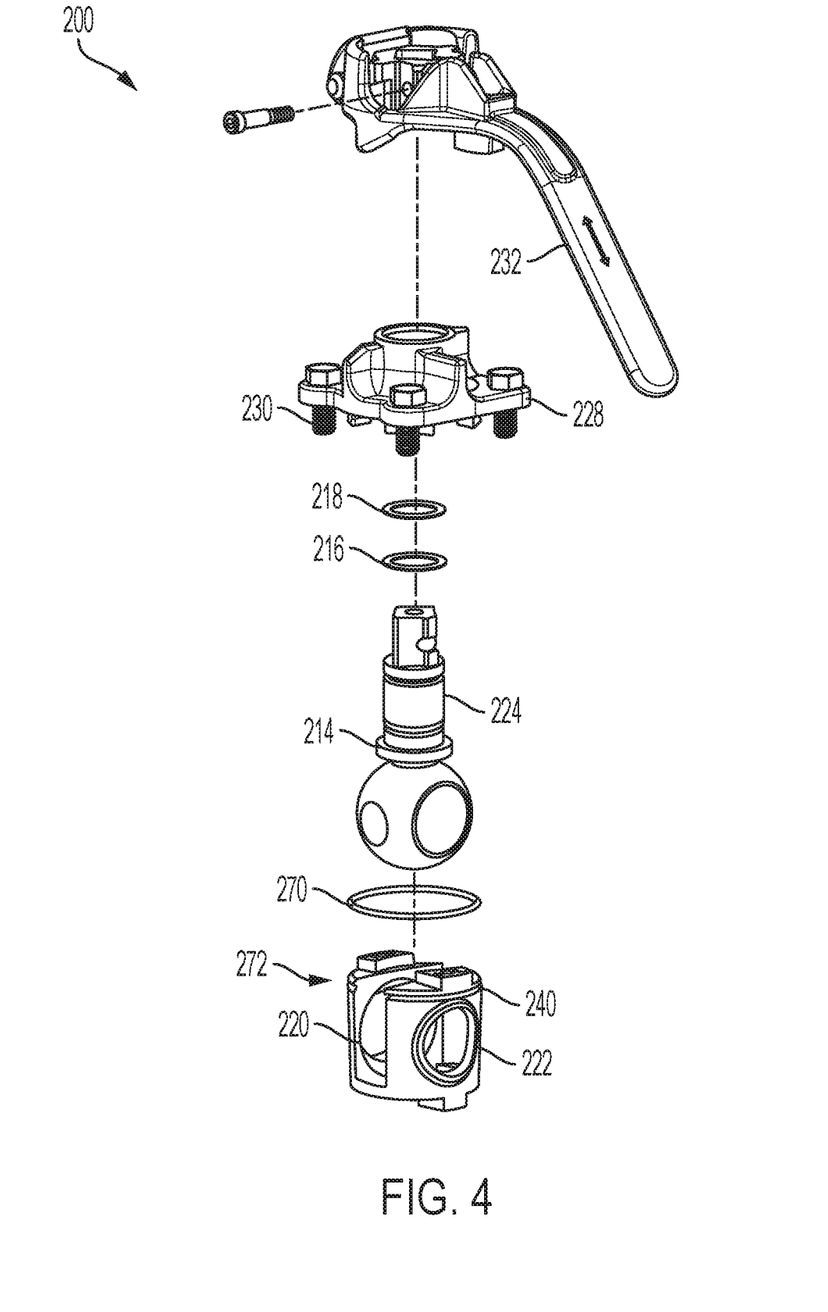
FIG. 4 is an exploded view of another angle cock cartridge according to the present invention.
Figure 5:
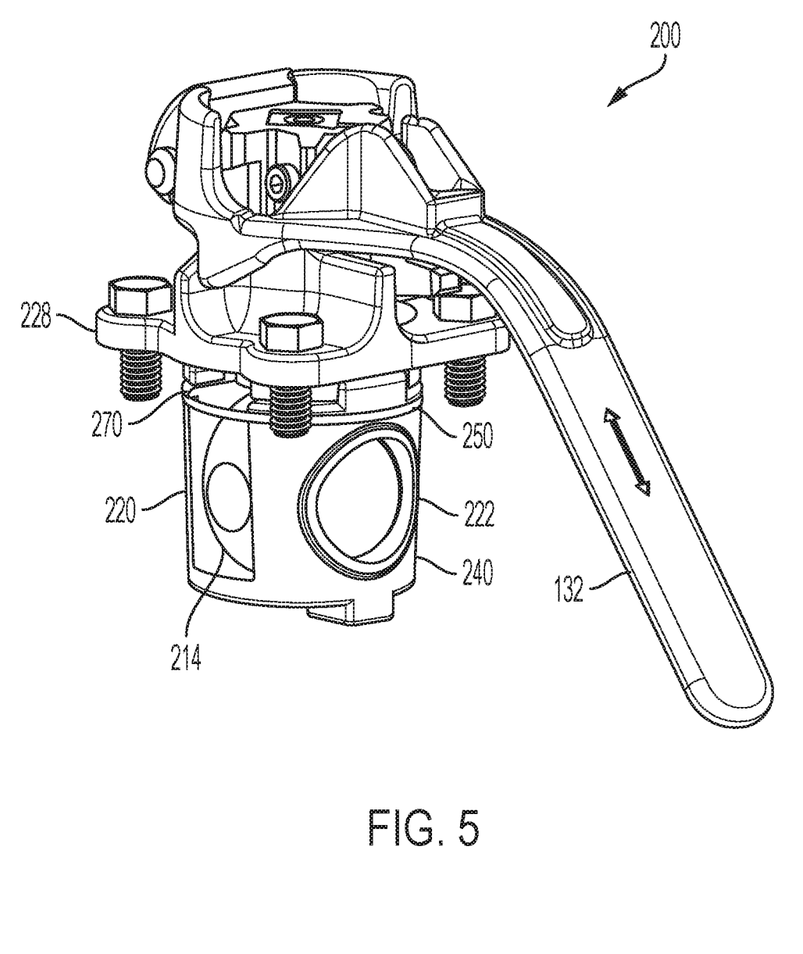
FIG. 5 is a perspective view of the angle cock cartridge of FIG. 4.

Referring to FIGS. 4 and 5, a second embodiments of the present invention comprises a repair cartridge 200 that includes a ball key 214 having O-rings 216 and 218 positioned about ball key shaft 224 that extends upwardly through a cover 228 to engage a handle 232. Repair cartridge 200 further includes a unitary ball seat 240 that includes internal surfaces 220 and 222 that act as ball seats, i.e., ball seat 240 is integrally formed with internal surfaces 220 and 222 so that all three functional elements are part of a discrete physical structure. In this embodiment, however, ball seat 240 has an upper opening 260 for allowing ball key 114 to be positioned between internal surfaces 220 and 222 prior to or during a replacement into a legacy angle cock 10. The lower end of ball seat 240 includes a pair of spacers 262 and 264 that are integrally formed with surfaces 220 and 222 that act as ball seats, and maintain surfaces 220 and 222 in spaced relation to each other and in secured relation to ball key 114 when positioned therein. A ring 270 is positioned about the upper end of ball seat 240, such as in a groove 272 formed circumferentially about the upper edge of ball seat 240, to maintain surfaces 220 and 222 against ball key 214 when positioned therein. Repair cartridge 200 may be inserted into legacy angle cock 10 to replace one or more worn out components, such as ball key 14, ball seat 20 or 22, cover 28, or O-ring 16 or 18. Worn out components are removed by unbolting cover 228 and removing all of the parts, the inserting repair cartridge 200, and then bolting cover 228 to body 12 using bolts 230. As before, handle 232 may be secured to ball key shaft 224 with a self-tapping screw 136 torqued to between 8.2 and 10 ft-lbs in normal practice.

Figure 6:
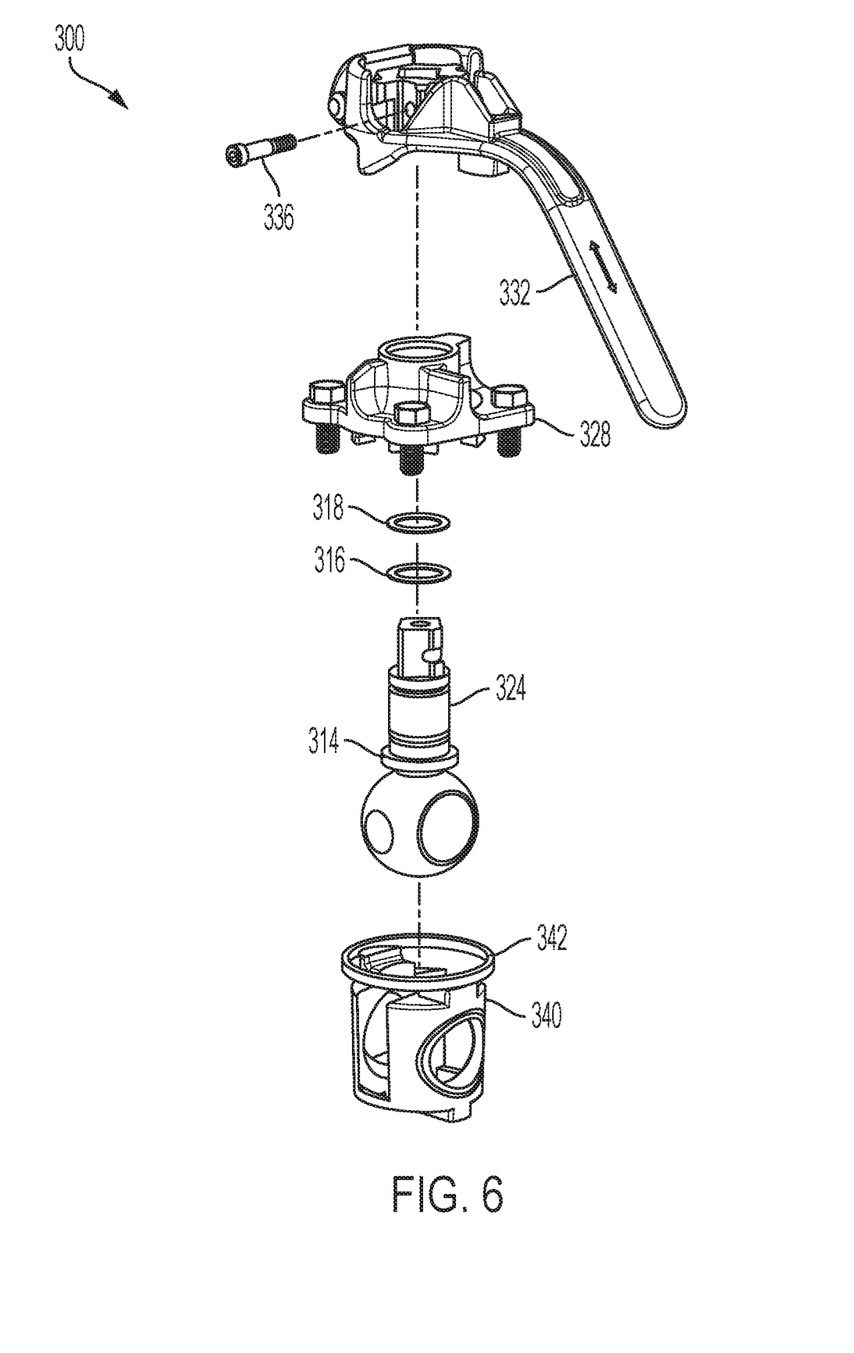
FIG. 6 is an exploded view of a further angle cock cartridge according to the present invention.
Figure 7:
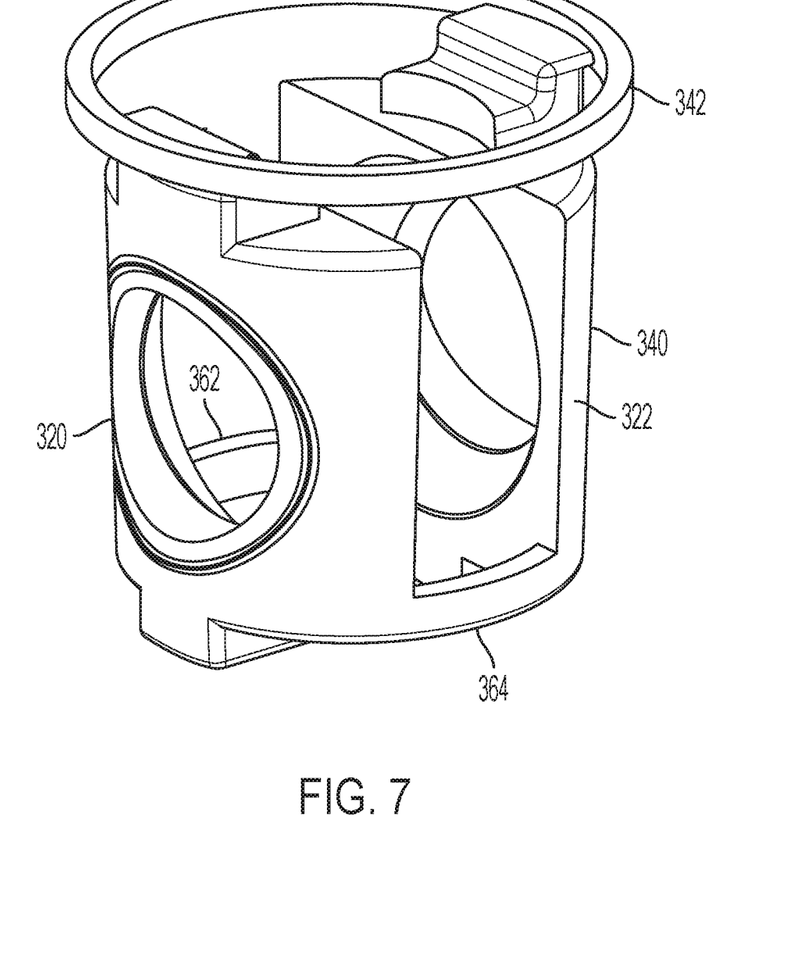
FIG. 7 is a perspective view of the unitary ball seat of the angle cock cartridge of FIG. 4.
Figure 8:
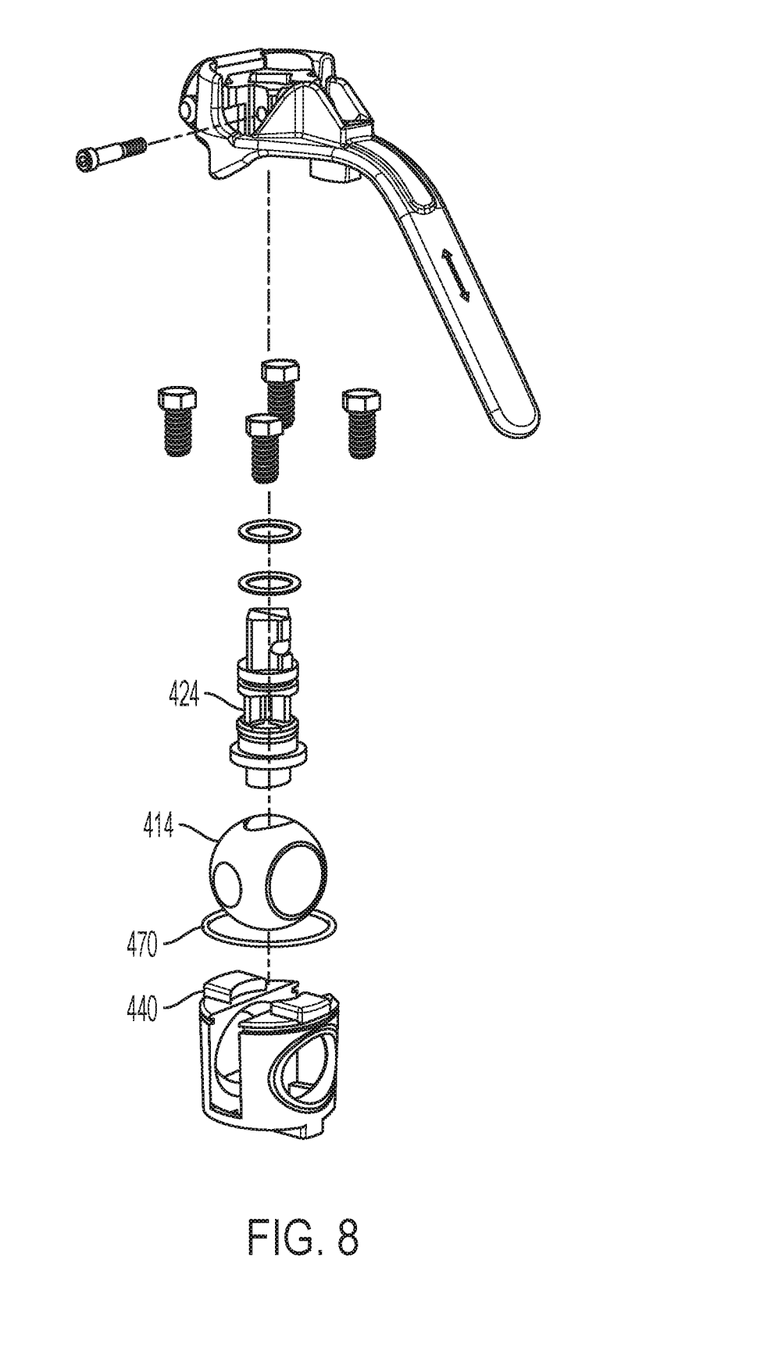
FIG. 8 is an exploded view of an additional angle cock cartridge according to the present invention.

Referring to FIGS. 6 and 7, a third embodiment of the present invention comprises a repair cartridge 300 that includes a ball key 314 having O-rings 316 and 318 positioned about ball key shaft 324 that extends upwardly through a cover 328 to engage a handle 332. Repair cartridge 300 further includes a unitary ball seat 340 that includes internal surfaces 320 and 322 that act as ball seats, i.e., ball seat 240 is integrally formed with internal surfaces 320 and 322 so that all three functional elements are part of a discrete physical structure. In this embodiment, ball seat 240 has an upper opening 260 for allowing ball key 114 to be positioned between internal surfaces 320 and 322 prior to or during a replacement into a legacy angle cock 10. The lower end of ball seat 340 includes a pair of spacers 362 and 364 that are integrally formed with surfaces 320 and 322 that act as ball seats, and maintain surfaces 220 and 322 in spaced relation to each other and in secured relation to ball key 314 when positioned therein. A ring 370 having a diameter large enough to permit ball key 314 to pass therethrough is integrally formed with and extends about the upper end of ball seat 340 to maintain surfaces 320 and 322 securely against ball key 314 when it is positioned therein. Repair cartridge 300 may be inserted into legacy angle cock 10 to replace one or more worn out components, such as ball key 14, ball seat 20 or 22, cover 28, or O-ring 16 or 18. Worn out components are removed by unbolting cover 328 and removing all of the parts, the inserting repair cartridge 300, and then bolting cover 328 to body 12 using bolts 330. As before, handle 332 may be secured to ball key shaft 324 with a self-tapping screw 336 torqued to between 8.2 and 10 ft-lbs in normal practice Referring to FIG. 8, the invention also comprises the use of a two-piece ball 414 and key shaft 424 in any of the foregoing embodiments.

Figure 9:
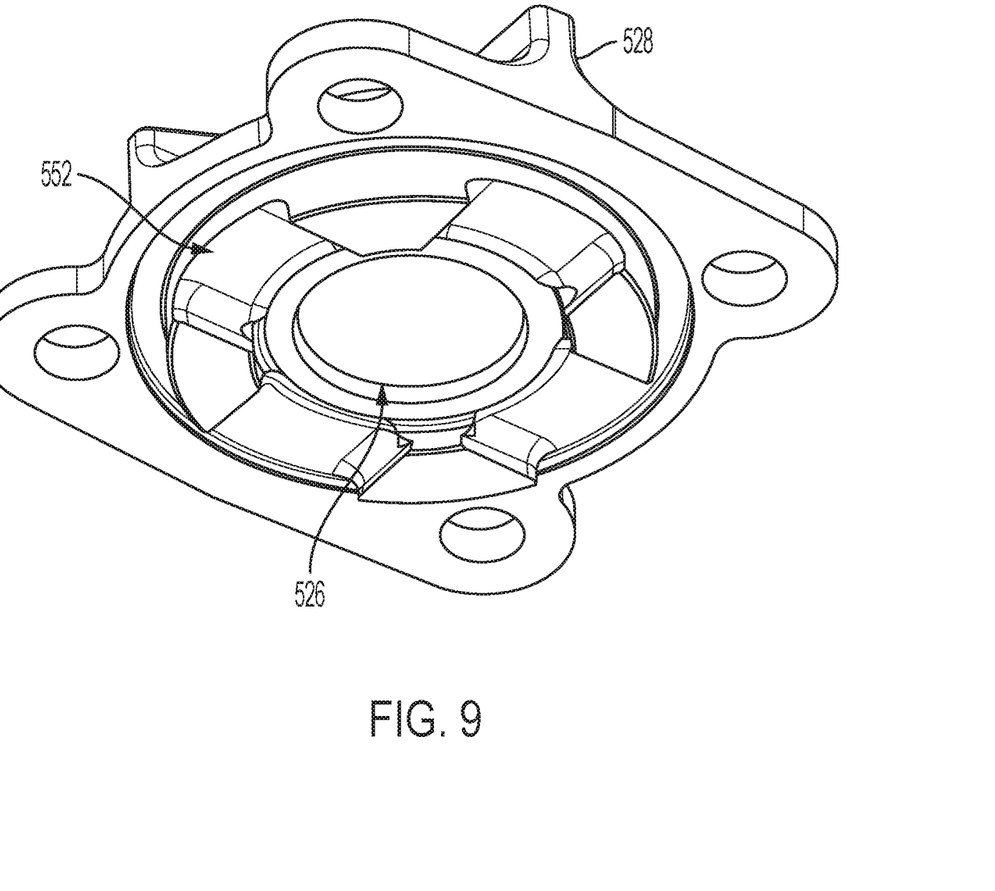
FIG. 9 is a perspective view of a cover for the angle cock cartridge of FIGS. 8.
Figure 10:
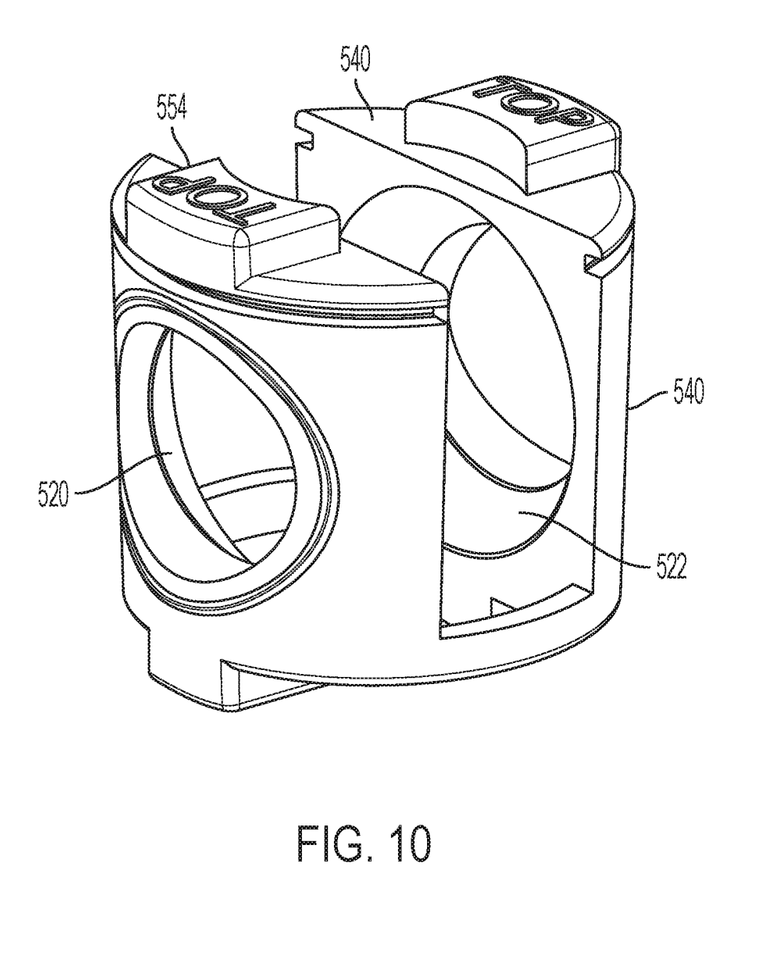
FIG. 10 is a perspective view of a unitary ball seat for the angle cock cartridge of FIG. 8.

Referring to FIGS. 9 and 10, the invention further comprises the use of a cover 528 having a central bore 526 that includes transverse (female) dovetail slots 552 corresponding to transverse male dovetails 554 on ball seat 540. Dovetails 352 and 354 engage to interlock ball seat 540 and cover 528, thereby forming a unitary cartridge assembly 500 for easy repair. This approach prevents ball key 514 and ball seat 540 from separating from key shaft 524 during installation.

Figure 11:
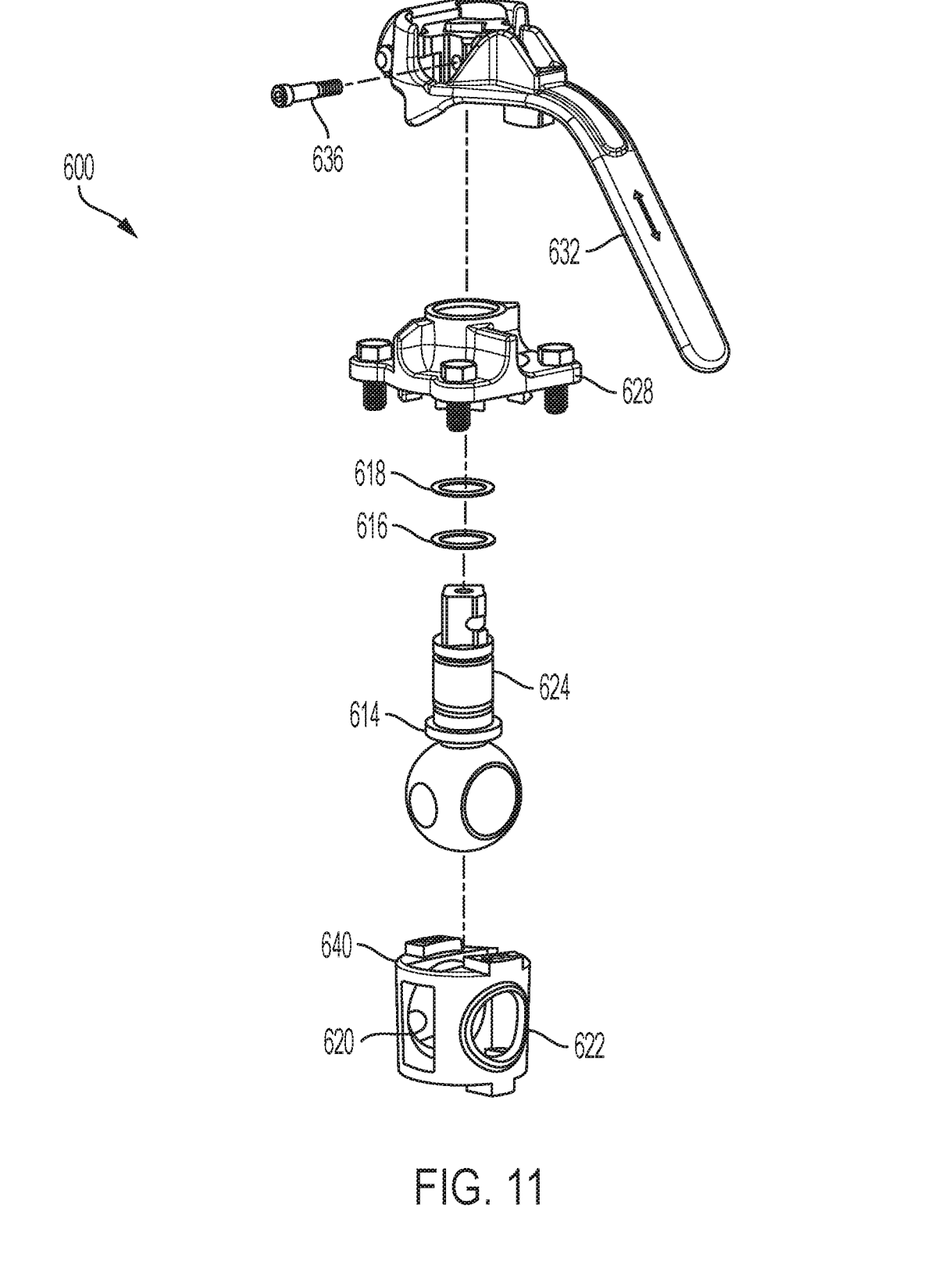
FIG. 11 is an exploded view of an additional angle cock cartridge according to the present invention.
Figure 12:
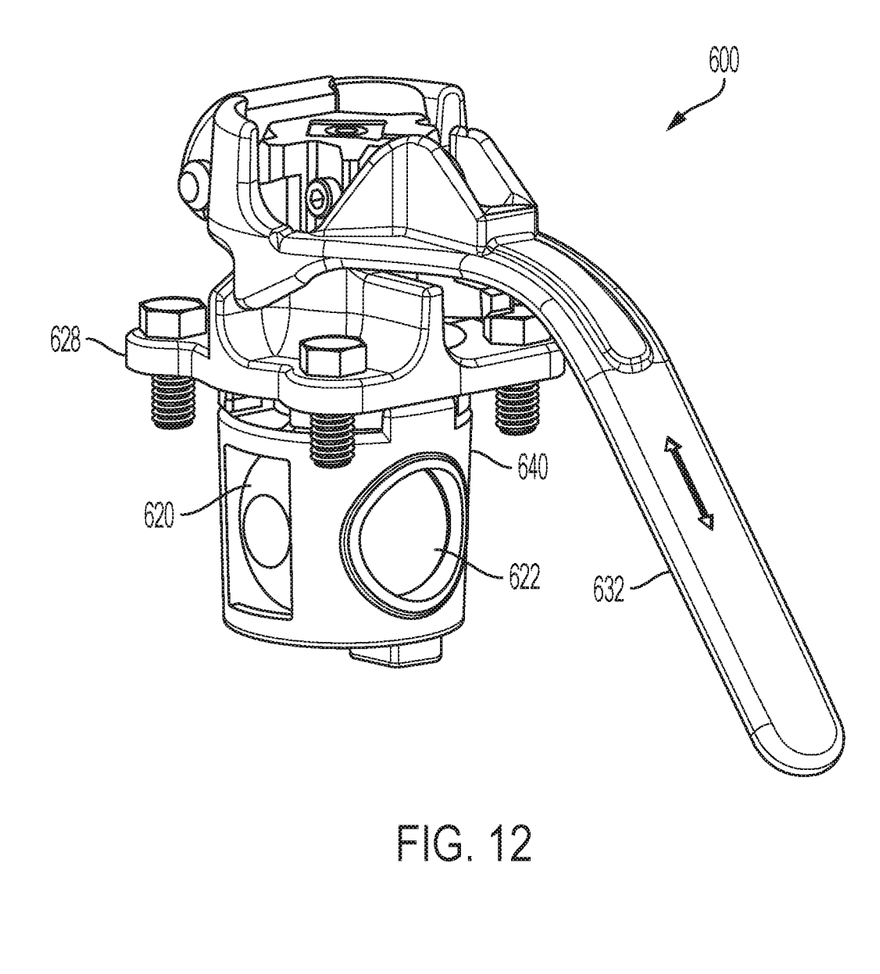
FIG. 12 is a perspective view of the angle cock cartridge of FIG. 11.

Referring to FIGS. 11 and 12, another embodiment of the present invention comprises a repair cartridge 600 for angle cock 10. Repair cartridge 600 includes a ball key 614 having O-rings 616 and 618 positioned about ball key shaft 624 that extends upwardly through a cover 628 to engage a handle 632. Repair cartridge 600 further includes a unitary ball seat 640 that includes internal surfaces 620 and 622 that act as ball seats, i.e., ball seat 640 is integrally formed with internal surfaces 620 and 622 so that all three functional elements are part of a discrete physical structure. Ball seat 640 allows ball key 614 to be positioned between internal surfaces 620 and 622 and then inserted as a discrete unit into a legacy angle cock 10 and an angle cock having a ball seat according to the invention that is in need of repair or replacement. The opposing end of ball seat 640 includes a pair of spacers 662 and 664 that are integrally formed with surfaces 620 and 622 that act as ball seats, and maintain surfaces 620 and 622 in spaced relation to each other and in secured relation to ball key 114 when positioned therein. Repair cartridge 600 may be inserted into legacy angle cock 10 to replace one or more worn out components, such as ball key 14, ball seat 20 or 22, cover 28, or O-ring 16 or 18. Worn out components are removed by unbolting cover 28 and removing all of the parts, the inserting repair cartridge 600, and then bolting cover 628 to body 12. As before, handle 632 may be secured to ball key shaft 624 with a self-tapping screw 636 torqued to between 8.2 and 10 ft-lbs in normal practice.

As further seen in FIGS. 1 through 12, the lower surface of any cover 128, 228, 328, 428, 528, 628 may be keyed to match the upper geometry of any unitary ball seat 140, 240, 340, 440, 540, 640 to ensure the desired alignment of handle 132, 232, 332, 432, 532, 632 once repair cartridge 100, 200, 300, 400, 500, 600 in installed into body 12. For example, conventional practice to have handle 32 extend longitudinally along the direction of the brake pipe when angle cock 10 is in the open position, and extend transversely when angle cock 10 is the closed position, so the keying of the lower surface of the cover may be keyed to match the upper geometry of the ball seat. Thus, any of the embodiment of the present invention may be keyed to achieve this orientation.

What is claimed is:
1. A replacement cartridge for an angle cock, comprising:
a ball key having a ball and a shaft coupled to the ball and extending from the ball to form a free end, wherein the shaft includes a first O-ring extending circumferentially therearound that is positioned proximately to the ball and a second O-ring extending circumferentially therearound that is positioned proximately to the free end;
a unitary ball seat having discrete first and second internal bearing surfaces each extending from an upper portion to a lower portion and being shaped for engaging opposing sides of the ball and a pair of curved spacers integrally formed with and extending only between the upper portions of the first and second internal bearing surfaces to maintain the first and second internal bearing surfaces in a spaced apart configuration and to form a lower opening between the first and second internal bearing surfaces that is dimensioned so that the ball can be passed through the lower opening and an upper opening that is dimensioned so that the shaft can extend upwardly from the ball seat and oppositely from the lower opening;
wherein the ball seat includes an upper surface having a first predetermined geometry;
a cover positioned over the ball seat and defining a bore through which the shaft of the ball key may extend, wherein a lower surface of the cover has a second predetermined geometry that corresponds to the first geometry so that the cover can only be attached and positioned in a predetermined orientation relative to the ball seat where the second predetermined geometry aligns with the first predetermined geometry; and a handle coupled to the shaft of the ball key for rotating the ball between the first and second internal bearing surfaces between an open position and a closed position, wherein the first predetermined geometry and the second predetermined geometry ensure that the handle is positioned to extend in only a specific direction when the ball is in the open position.

2. The replacement cartridge of claim 1, wherein the ball and the shaft of the ball key are integrally formed together.

3. The replacement cartridge of claim 1, further comprising a ring secured to the unitary ball seat and positioned adjacently to the cover.

4. The replacement cartridge of claim 1, wherein the ball and the shaft of the ball key are distinct from each other and secured together.

5. A method of repairing an angle cock, comprising the steps of:

disconnecting a handle of the angle cock from a first shaft of a first ball key extending through the angle cock;

removing a cover that is positioned over a first ball seat and has a bore through which the first shaft of the first ball key extends;

removing the first ball key from the ball seat;

removing the ball seat from the angle cock;

positioning a unitary ball seat having discrete first and second internal bearing surfaces each extending from an upper portion to a lower portion and being shaped for engaging opposing sides of the ball key and a pair of curved spacers integrally formed with and extending only between the upper portions of the first and second internal bearing surfaces that maintain the first and second internal bearing surfaces in a spaced apart configuration and form a lower opening between the first and second internal bearing surfaces that is dimensioned so that the ball can be passed through the lower opening and an upper opening that is dimensioned so that the shaft can extend upwardly from the ball seat and oppositely from the lower opening wherein the ball seat includes an upper surface having a first predetermined geometry;

positioning a second ball key in the unitary ball seat by passing the second ball key into the lower opening with the shaft extending upwardly, wherein the second ball key comprises a second shaft coupled to a second ball and extending from the second ball to form a free end, wherein the second shaft includes a first O-ring extending circumferentially therearound that is positioned proximately to the second ball and a second O-ring extending circumferentially therearound that is positioned proximately to the free end;

attaching the cover to the angle cock so that the second shaft of the second ball key extends through the bore and a lower surface of the cover having a second predetermined geometry corresponding to the first predetermined geometry of the unitary ball seat so that the cover is positioned in a predetermined orientation relative to the unitary ball seat; and attaching the handle to the second shaft of the second ball key, wherein the first predetermined geometry and the second predetermined geometry ensure that the handle is positioned to extend in only a specific direction when the second ball is in the open position.

6. The method of claim 5, wherein the ball and the shaft of the ball key are integrally formed together.

7. The method of claim 5, wherein the unitary ball seat further comprises a ring secured to the unitary ball seat.

8. The method of claim 5, wherein a ball of the ball key and the shaft of the ball key are distinct from each other and secured together.

* * * * *